United States Patent [19]

Nagano et al.

[11] 4,226,317
[45] Oct. 7, 1980

[54] BICYCLE HUB

[75] Inventors: Masashi Nagano; Koya Sonoi, both of Sakai, Japan

[73] Assignee: Shimano Industrial Company, Limited, Osaka, Japan

[21] Appl. No.: 943,709

[22] Filed: Sep. 19, 1978

[30] Foreign Application Priority Data

Sep. 29, 1977 [JP] Japan ............................ 52/131338[U]

[51] Int. Cl.$^2$ ...................... F16D 41/00; F16H 11/08
[52] U.S. Cl. ........................................................ 192/64
[58] Field of Search ......................................... 192/64

[56] References Cited

U.S. PATENT DOCUMENTS

| | | | |
|---|---|---|---|
| 2,489,934 | 11/1949 | Schwinn | 192/64 |
| 3,554,340 | 1/1971 | Shimano et al. | 192/64 |
| 3,900,088 | 8/1975 | Ozaki | 192/64 |
| 4,116,319 | 9/1978 | Nagano et al. | 192/64 |

Primary Examiner—Allan D. Herrmann
Attorney, Agent, or Firm—Stevens, Davis, Miller & Mosher

[57] ABSTRACT

A bicycle hub is provided with a drive unit incorporated with a hub body having hub flanges, the drive unit being positioned axially outward from the hub body and comprising a cone, a driving member, at least one sprocket and a unidirectional rotary transmission. The hub body extends axially outward to form a tubular mount having an external spline and further extends axially outward from the mount to form a tubular extension. The cone has an internal spline fit to the mounts external spline and a tubular holder fit onto the tubular extension; whereby the spline fit of the cone and mount, and the insertable engagement of the holder with the tubular extension supports the drive unit to the hub body, the drive unit being fixedly thereto by means of a bearing screwed with a hub shaft.

4 Claims, 4 Drawing Figures

BICYCLE HUB

This invention relates to a bicycle hub, and more particularly to a bicycle hub attached to the rear wheel of a bicycle and having a drive unit.

Generally, this kind of hub, as shown in FIG. 4, comprises a hub shaft 1, a hub body 2, a bearing 3 and steel balls 5 for rotatably supporting the hub body 2 to the hub shaft 1, and a drive unit A incorporated with the hub body 2. The drive unit A is constructed from a frustum-like cone 7, a cylindrical driving member 8, at least one of the sprockets 9 attached to the outer periphery of the driving member 8, a pair of bearings 10 and 11 including steel balls 13 and 14 for supporting the driving member 8 to the cone 7, and a unidirectional rotary transmission 12 inserted between the driving member 8 and the cone 7.

In the bicycle hub according to the foregoing, the drive unit A is incorporated with the hub body 2 in such a manner that the cone 7, as shown in FIG. 4, is made larger in axial length than the driving member 8 to provide a screw thread a at the outer periphery, and the hub shell 21 at the hub body 2 has at its inner periphery a screw thread b, thereby permitting the cone 7 to be screwed with the hub shell 21 through the threads a and b.

Hence, it is difficult and takes too much time to incorporate the drive unit A with the hub body 2, and, removal of the drive unit A is also difficult for the following reasons.

First, both the threads a and b at the cone 7 and hub shell 21 are self-tightening following the wheel rotation while driving the bicycle forward, thereby preventing unexpected looseness of the cone 7. Hence, both the threads a and b are greatly tightened while driving the bicycle, thereby requiring considerable strength to unscrew the cone 7 in order to remove the drive unit A from the hub body 2.

Also, the cone 7 covered by the driving member 8 is difficult to screw or unscrew to the hub shell 21, especially when being unscrewed. In detail, the unidirectional rotary transmission is inserted between the driving member 8 and the outer periphery of the cone 7, through which the forward rotation of the driving member 8 or sprocket 9 is transmitted to the cone 7 when keeping the hub shell 21 stationary, thereby facilitating screwing of the cone 7. However, when unscrewing the cone 7 to remove the drive unit A from the hub, the driving member 8 and sprocket 9 rotate freely with respect to the cone 7, whereby it is impossible to unscrew the cone 7 even by rotating the driving member 8 by hand. Hence, the cone 7 itself should be unscrewed by use of a tool applied to its narrow end face, which results in difficulty in removing the drive unit A.

An object of the invention is to provide a bicycle hub permitting ready removal of the drive unit from the hub body as well as incorporating it therewith, and to provide the drive unit in assembly supported stably and reliably to the hub body.

The invention has been designed to adopt a spline fit in place of the conventional screw engagement, the spline fit being convenient in comparison with the latter engagement. Also, disadvantages such as the backlash of the cone caused by clearance at the spline fit and side way motion of the bicycle wheel caused by the backlash, are avoided, thereby simplifying assembly and dismantling of the hub while maintaining essential performance.

In detail, the hub of the invention is so constructed that at one axial end of the hub body there is provided a tubular mount extending axially outward from a hub flange of the hub shell, a tubular extension is provided to extend further axially outward from the mount, an external spline is provided at the outer periphery of the mount, and an internal spline to mate with the external spline is provided at the inner periphery of one axial end of the cone at the drive unit. The cone includes at its intermediate portion an inner periphery just fit with the outer periphery of the tubular extension so that the tubular extension supports the cone, and a bearing is screwed to the hub shaft to rotatably support thereto the hub body, thereby incorporating the drive unit with the hub body. Hence, the bearing is unscrewed from the hub shaft, and the drive unit is merely drawn axially outward from the hub body thereby being removed simply and easily.

These and other objects and novel features of the invention will be more apparent from the following description of the embodiments thereof in accordance with the accompanying drawings, in which.

Figure 1:
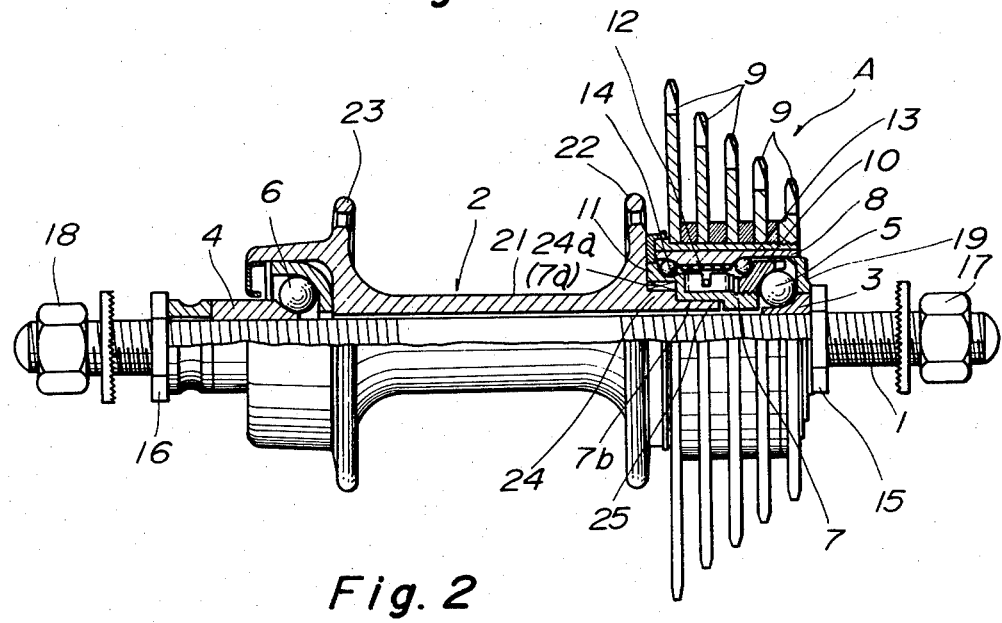
FIG. 1 is a partially cutaway front view of the bicycle hub of the invention.
Figure 2:
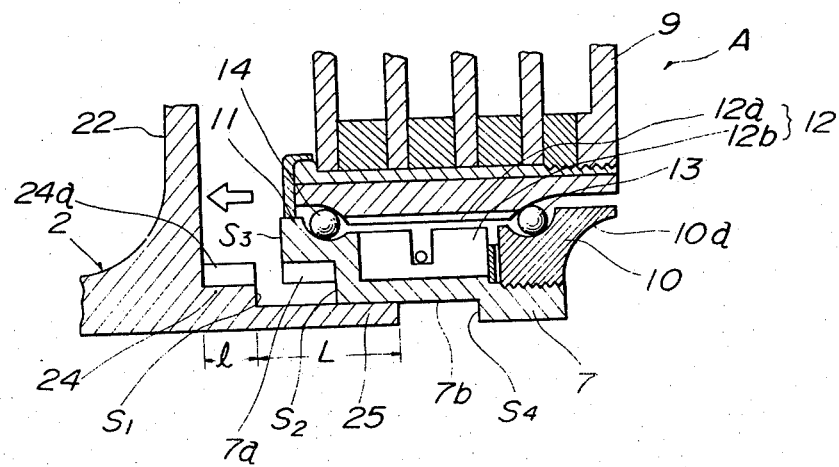
FIG. 2 is an enlarged sectional view of the principal portion thereof, showing how to incorporate the drive unit with the hub body.
Figure 3:
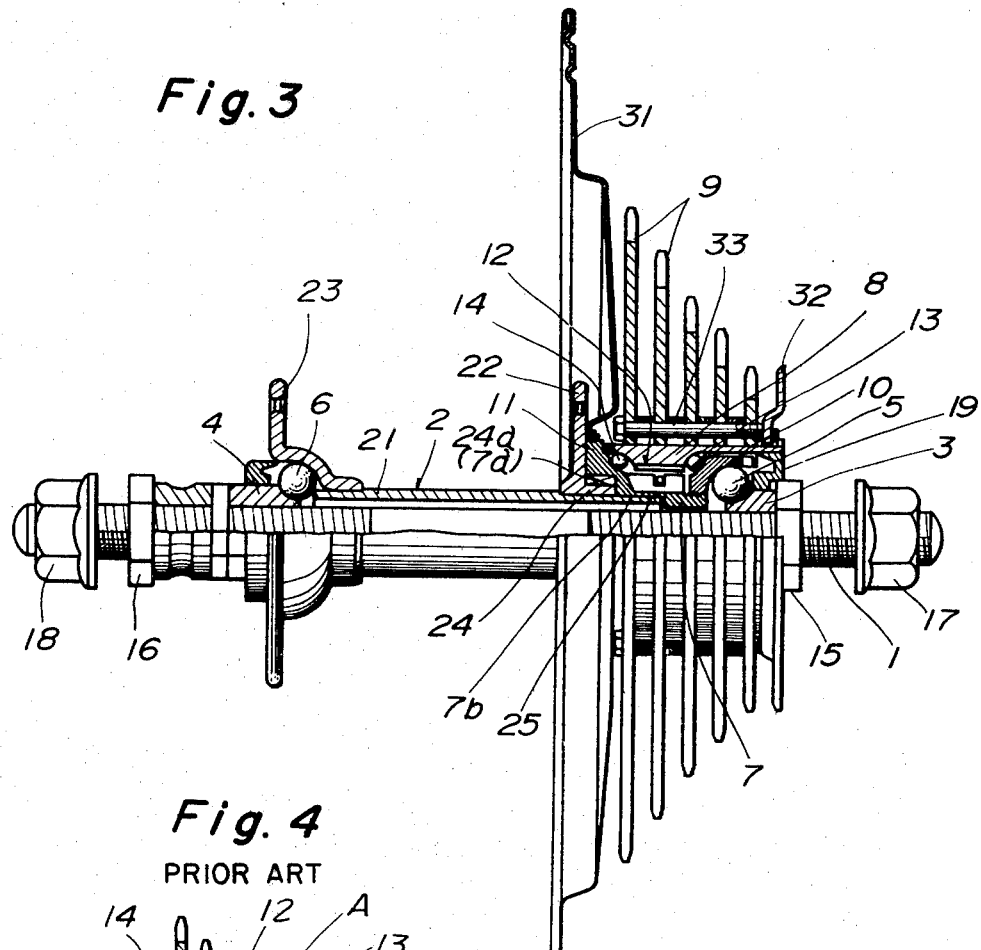
FIG. 3 is a partial cutaway front view of a modified embodiment of the invention.

A typical embodiment of the bicycle hub of the invention is shown in FIGS. 1, 2 and 3. The basic construction of the hub is the same as the conventional one in FIG. 4, comprising a hub shaft 1, a hub body 2, a pair of first and second bearings 3 and 4 for rotatably supporting the hub body 2 to the hub shaft 1, a pair of first and second steel balls 5 and 6 carried by the bearings 3 and 4, and a drive unit A.

The drive unit A comprises a frustum-like cone 7, a cylindrical driving member 8 larger in diameter than the cone 7, at least one of the sprockets 9 mounted to the outer periphery of the driving member 8 (in the drawings five sprockets are shown), a pair of bearings 10 and 11 including balls 13 and 14 respectively for rotatably supporting the driving member 8 to the cone 7, and a unidirectional rotary transmission 12 inserted between the inner periphery of the driving member 8 and the outer periphery of the cone 7. In addition, the unidirectional rotary transmission 12 includes ratchet teeth 12a provided at the inner periphery of the driving member 8 and pawls 12b at the outer periphery of the cone 7, the pawls 12b being meshed with the ratchet teeth 12a.

Figure 4:
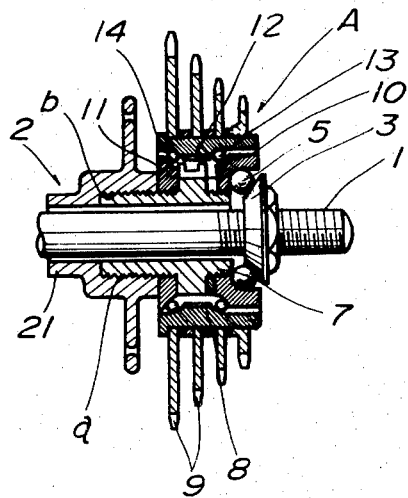
FIG. 4 is a partial sectional view of the conventional bicycle hub.

In the foregoing construction shown in FIGS. 1, 2 and 3, parts in common with those in FIG. 4 are represented by reference numerals identical therewith.

The invention is directed to improve the aforesaid well-known bicycle hub so that the drive unit A may easily be incorporated with the hub body 2 and be removed therefrom. The invention will be detailed in the following description in accordance with FIGS. 1 and 2.

The hub body 2 shown in FIGS. 1 and 2 is composed of a hub shell 21 integrated with hub flanges 22 and 23 at both axial ends thereof. A tubular mount 24 is provided at one axial end of the hub body 2 supported by the first bearing 3, i.e., the right side in FIGS. 1 and 2, and extends axially outward the one flange 22. A tubular extension 25 is provided to extend further axially outward from the mount 24, the tubular mount 24 and extension 25 being integrated with the hub body 2. At the outer periphery of the tubular mount 24 is formed external spline extending axially therefrom. Furthermore, the tubular mount 24 is, as shown in FIGS. 1 and 2, made larger in diameter than the tubular extension 25 and the tubular extension 25 has an axial length L larger than that l of the mount 24.

The drive unit A incorporated with the hub body 2 according to the foregoing includes the cone 7 whose one axial end at the left side in FIGS. 1 and 2 is made larger in diameter than the mount 24 and slightly larger in an axial length than the length l thereof, and has at the inner periphery an internal spline 7a to fit to the external spline 24a. The cone 7 also is provided at its intermediate portion with a tubular holder 7b provided in continuation of the larger diameter portion and having an inner diameter smaller than the inner diameter of the tubular extension 25 so as to be fit onto the tubular extension 25. In addition, the bearing 11 at the left side of the drive unit A is integral with the cone 7 and bearing 10 at the right side is screwed therewith, the right side bearing 10 having at its axially outer surface a ball race 10a carrying first balls 5 through which the hub body 2 is supported to the hub shaft 1.

The first and second bearings 3 and 4, which support the hub body 2 to the hub shaft 1, are screwed therewith, the first bearing 3 holding the first balls 5 carried by a ball race 10a of the right side bearing 10, whereby the drive unit A is urged leftward in FIGS. 1 and 2 through the first balls 5 and right side bearing 10.

Now, in the bicycle hub shown in FIGS. 1 and 2 the drive unit A is incorporated with the hub body 2 in such a manner that the cone 7 is inserted onto the hub shaft 1, the internal spline 7a at the cone 7 is fit to the external spline 24a at the tubular mount 24, the holder 7b is fit onto the tubular extension 25, and the first bearing 3 is screwed to the hub shaft 1. The first bearing 3 is screwed with the hub shaft 1 to allow the first balls 5 carried by the bearing 3 to be in contact with the race 10a of the right side bearing 10. The bearing 3 is screwed to urge the drive unit A leftward through the bearing 10, whereby an annular shoulder $S_2$ formed between the larger diameter end portion of the cone 7 and the tubular holder 7b thereof is in contact with a shoulder $S_1$ located between the tubular mount 24 and the tubular extension 25 of the hub body 2, thus fixing the drive unit A to the hub body 2.

On the other hand, the drive unit A assembled as described above is easily removed from the hub body 2 by being pulled out after unscrewing the first bearing 3 from the hub shaft 1.

In addition, in FIG. 1 the reference numeral 15 designates a lock nut for fixing the first bearing 3; 16 designates a lock nut for fixing the second bearing 4; 17 and 18 designate nuts for fixing the hub shaft 1 to the bicycle frame (not shown); and 19 designates a sealing member inserted between the driving member 8 and the first bearing 3.

In the construction shown in FIGS. 1 and 2, the second bearing 4, which is screwed with the hub shaft 1, may be fixed integral therewith. The tubular mount 24, which is larger in outer diameter than the tubular extension 25, may be approximately equal thereto in length.

The axial length l of the mount 24 is of a minimum length for transmitting the driving force from the cone 7 to the hub body 2.

It is preferable that the tubular mount 24 has the minimum axial length l and an outer diameter larger than that of the tubular extension 25, and preferable that the tubular extension 25 has its axial length larger than that of the mount 24. This permits the spline fit of the cone 7 to the mount 24 to be at the larger diameter end portion so as to be tight, thereby reliably transmitting the driving force. The cone 7 also allows the holder 7b to be fit to the tubular extension 25 before the internal spline 7a is fit to the external spline 24a, whereby the cone 7 is made coaxial with the tubular mount 24. In other words, the tubular extension 25 guides the cone 7 to be in spline fit with the mount 24, thereby facilitating the spline fit between the cone 7 and the mount 24.

The tubular extension 25, which serves to support the cone 7 in spline fit, is able to more stably support the cone when it is larger in axial length than the tubular mount 24, i.e. the spline width. In other words, the backlash of the cone 7 caused by clearance at the spline fit is reduced more effectively when the tubular extension 25 is larger in axial length.

When incorporating the drive unit A with the hub body 2, the aforesaid shoulder $S_2$ of the cone 7 in contact with $S_1$ of the hub body 2 as shown in FIGS. 1 and 2, may be replaced by the left end face $S_3$ of the cone 7 in contact with the axially outward surface of the hub flange 22, or by a shoulder $S_4$ formed axially outward from the holder 7b and being in contact with an end face of the tubular extension 25. Furthermore, the tubular extension 25 may be elliptical or square other than circular in section. In this instance, the inner periphery of the holder 7b at the cone 7 is also made elliptical or square in section so that both the splines 24a and 7a are mated with each other simultaneously when fitting the cone 7 onto the tubular extension 25 through the holder 7b, thereby further simplifying the spline fit and improving the assembly process.

The bicycle hub shown in FIG. 3 is basically constructed identical to that shown in FIGS. 1 and 2, but a pair of separate hub flanges 22 and 23 are inserted onto the hub shell 21 so as to be integral therewith by means of welding or the like. The hub shell 21 extends at its one axial end, i.e., the right end in FIG. 3, axially outward from the hub flange 22 to form the tubular extension 25.

Other parts not included in the construction according to FIG. 3 are essentially identical with those in FIGS. 1 and 2 and are represented by the same reference numerals. Additionally, the reference numeral 31 designates a spoke protector; reference numeral 32, a chain guide; and reference numeral 33, bolts for connecting five sprockets 9.

As clearly understood from the aforesaid description, the bicycle hub of the invention is so constructed that the tubular mount extending axially outward from the hub flange and tubular extension extending further axially outward from the tubular mount, are provided at one axial end of the hub body. The tubular mount has at its outer periphery the external spline and the cone at the drive unit has at the inner periphery of one axial end thereof an internal spline fit to the external spline. The intermediate portion of the tubular holder is fit onto the tubular extension so that the internal spline is fit with the external spline, the holder is fit onto the tubular extension, and the first bearing is screwed to the hub shaft thus fixing the cone to the hub body. Hence, the drive unit is moved axially only to fit the cone to the hub body to thereby quicken assembly of the hub. The tubular extension is, as shown in the embodiment, preset to be larger in axial length than the tubular mount 7 whereby the holder is first fit onto the tubular extension and thereafter both the splines are mated. Hence, the tubular extension serves to guide the cone to be coaxial with the same for axially moving the drive unit, thereby facilitating the spline fit.

On the other hand, the spline fit cone and tubular mount are not as defective as the conventional screwable engagement which becomes tight hindering the turning of the cone, whereby the drive unit is pulled axially outwardly, for example, by gripping the sprocket after unscrewing the first bearing, thus readily removing the cone from the tubular mount resulting in easy removal of the drive unit from the hub body.

Furthermore, the cone, which is spline fit to the mount and fixed to the hub body through the first bearing screwed to the hub shaft, is fit at the holder to the tubular extension, whereby the backlash of the cone caused by clearance at the spline fit and the corresponding side way motion of the wheel are avoidable in spite of the use of the spline fit.

As a result, the bicycle hub of the invention eliminates the defect of conventional hubs, thereby facilitating assembly and dismantling of the hub while keeping the essential performance thereof.

While a preferred embodiment of the invention has been described using specific terms, such description is for illustrative purpose only, and it is to be understood that changes and variations may be made without departing from the spirit or scope of the following claims.

What is claimed is:

1. In a bicycle hub having a hub shaft, a hub body comprising: a hub shell and a pair of hub flanges provided at both axial ends of said hub shell, a pair of first and second bearings supporting said hub body rotatably to said hub shaft, and a drive unit incorporated with said hub body for driving said hub body, said drive unit having a frustum-like cone, a cylindrical driving member, at least one sprocket, a pair of bearings for supporting said driving member rotatably to said cone, and a unidirectional rotary transmission inserted between said driving member and said cone, wherein the improvement comprises said hub body having at its one axial end supported by said first bearing a tubular mount extending axially outward from said hub body, said tubular mount having at its outer periphery an external spline extending axially from the same, said cone at said drive unit being provided at the inner periphery of one axial end thereof with an internal spline to be fit with said external spline at said mount, said cone having at its axially intermediate portion the inner periphery in continuation with said internal spline, said inner periphery having an inner diameter fit to the outer periphery of said tubular extension, at least one of said bearings being screwed to said hub shaft, whereby said drive unit is detachably connected to said hub body, and said drive unit including said cone is spline fit to said tubular mount at the hub body and supported by said tubular extension thereof.

2. The bicycle hub according to claim 1, wherein said tubular mount at said hub body is made larger in diameter than said tubular extension.

3. The bicycle hub according to claim 2, wherein said tubular mount at said hub body is the minimum axial length necessary for transmitting the driving force from said cone to said hub body and said tubular extension is larger in axial length than said tubular mount.

4. The bicycle hub according to claim 1, wherein said hub shell and a pair of hub flanges with bosses are separated, said hub flanges being fixed to both axial ends of said hub shell, the boss of one of said hub flanges being provided with a tubular mount having an external spline, and said hub shell being extended at one axial end thereof axially outward from said boss of said hub flange, thereby forming said tubular extension extending from said boss.

* * * * *